United States Patent [19]

Wawra et al.

[11] Patent Number: 4,799,509
[45] Date of Patent: Jan. 24, 1989

[54] VENTING ARRANGEMENT FOR FUEL TANKS OF MOTOR VEHICLES

[75] Inventors: Helmut Wawra, Korb; Dieter Scheurenbrand, Wolfschlugen; Wolfgang Kleineberg, Altbach, all of Fed. Rep. of Germany

[73] Assignee: Daimler-Benz Aktiengesellschaft, Stuttgart, Fed. Rep. of Germany

[21] Appl. No.: 95,780

[22] Filed: Sep. 14, 1987

[30] Foreign Application Priority Data

Sep. 18, 1986 [DE] Fed. Rep. of Germany ....... 3631720
Jun. 13, 1987 [DE] Fed. Rep. of Germany ....... 3719834

[51] Int. Cl.$^4$ .............................................. F16K 24/00
[52] U.S. Cl. ....................................... 137/587; 137/44; 137/132; 280/834; 220/85 S
[58] Field of Search ............... 137/587, 132, 38, 44; 280/5 A; 220/85 S

[56] References Cited

U.S. PATENT DOCUMENTS

| | | | |
|---|---|---|---|
| 3,643,690 | 2/1972 | Sarai | 137/587 |
| 3,800,978 | 4/1974 | Sigwald | 137/587 |
| 3,805,829 | 4/1974 | Yamamoto et al. | 137/587 |
| 3,967,633 | 7/1976 | Hallanger et al. | 137/587 |
| 4,444,333 | 4/1984 | Anhegger | 137/587 |
| 4,664,144 | 5/1987 | Lemmon | 137/587 |

FOREIGN PATENT DOCUMENTS 1335815 7/1963 France .................................. 137/587

*Primary Examiner*—A Michael Chambers
*Attorney, Agent, or Firm*—Barnes & Thornburg

[57] ABSTRACT

A vent arrangement for fuel tanks of motor vehicles which includes an expansion tank, with which is connected an expansion line extending horizontally in the vehicle transverse direction which includes two line sections extending in mutually opposite directions, of which one terminates in the atmosphere and prevents an outflow of fuel in the turned-over head position of the fuel tank. In order that also in special positions of the fuel tank conditioned on accidents, fuel cannot flow to the outside in non-acceptable quantities by way of the expansion line, an enlargement is provided in the line section terminating in the atmosphere in proximity of the tank side wall from which it extends away; fuel flowing out of the expansion line in a tank side position retaining the enlargement above the plane of the fuel level sucks gas out of the enlargement while the volume of the enlargement is so selected that the gas quantity present in the enlargement suffices with fuel flowing out to the outside up to the interruption of a siphoning action produced inside of the enlargement on the fuel.

19 Claims, 9 Drawing Sheets

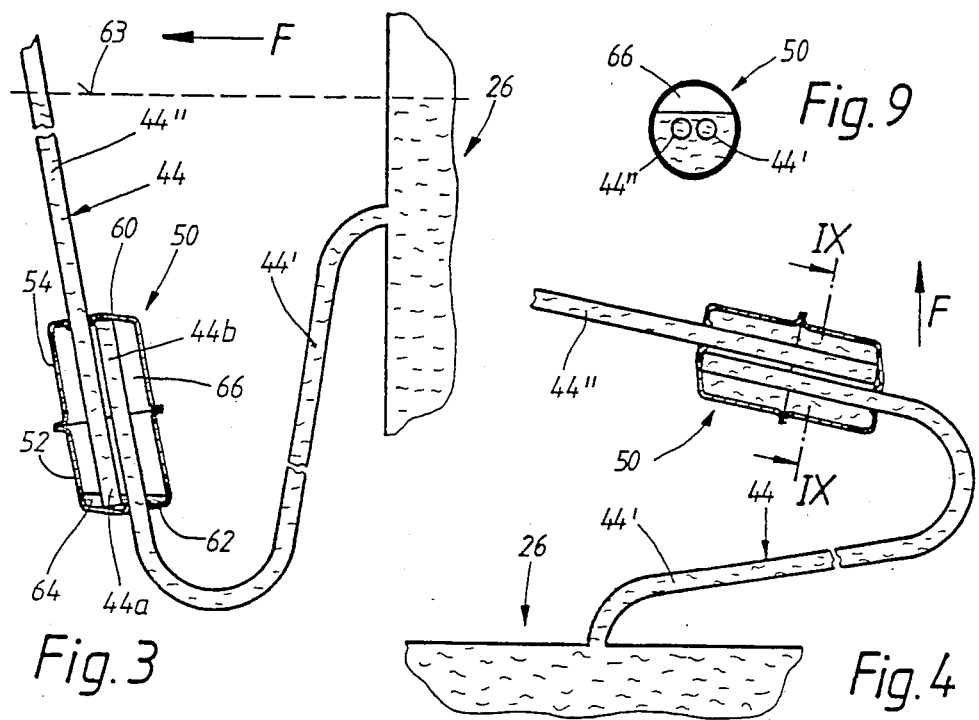
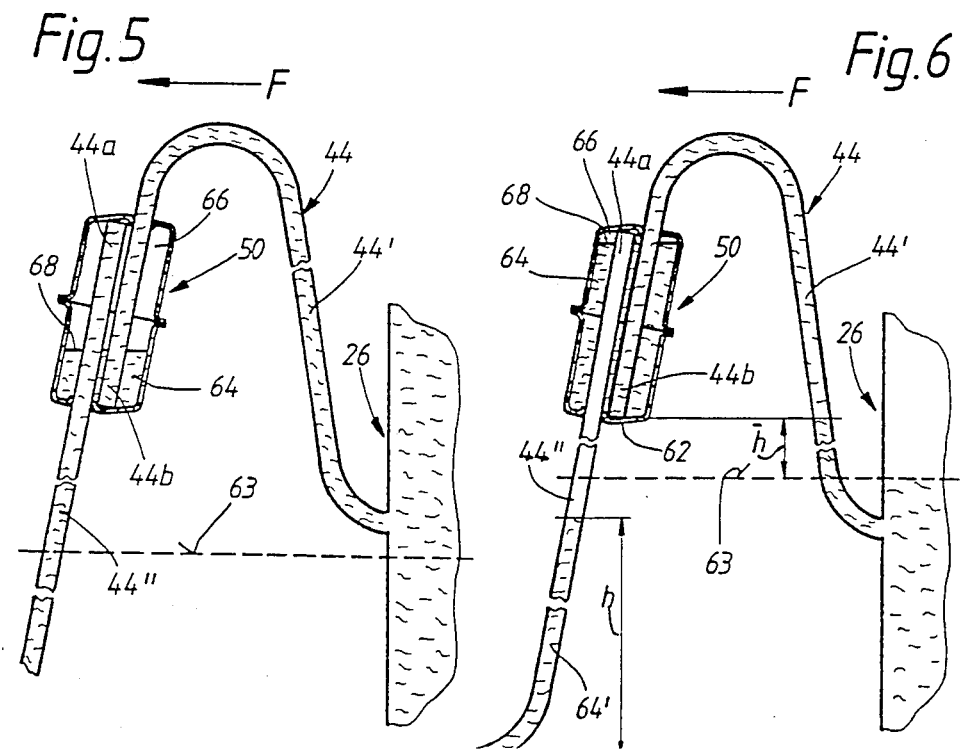

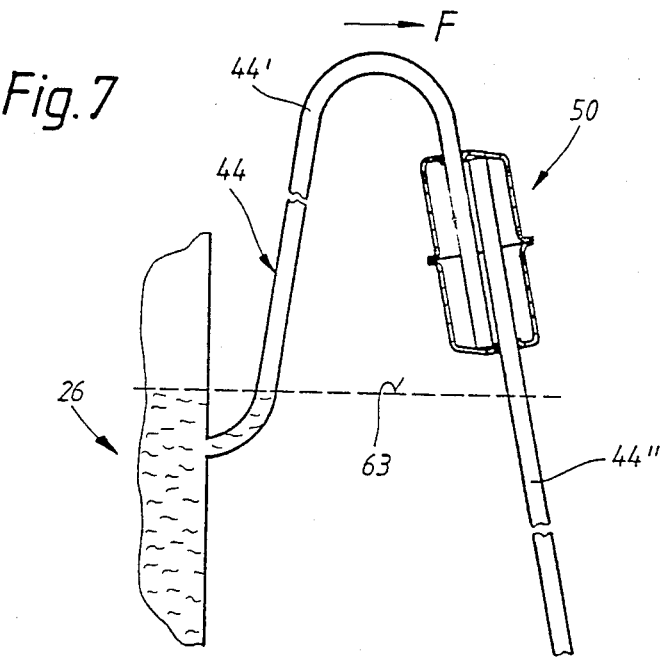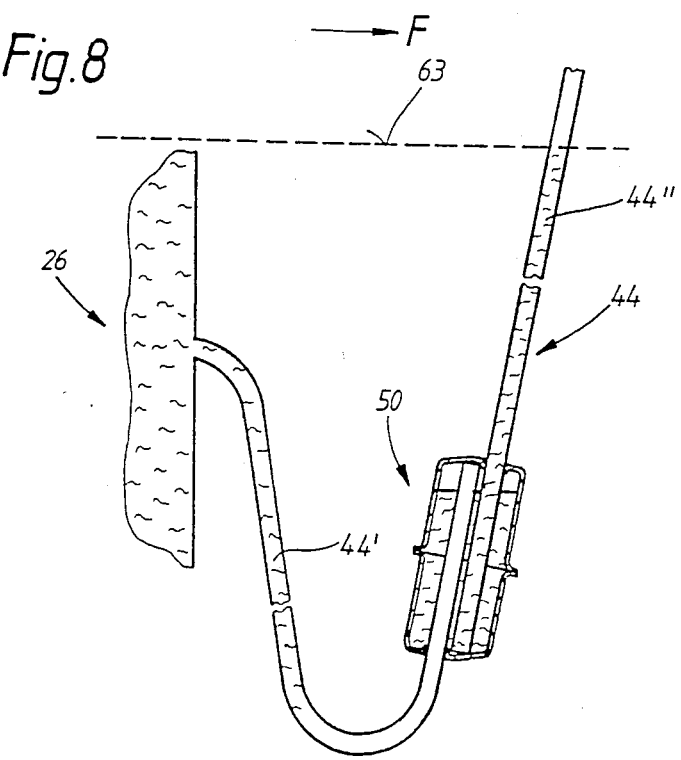

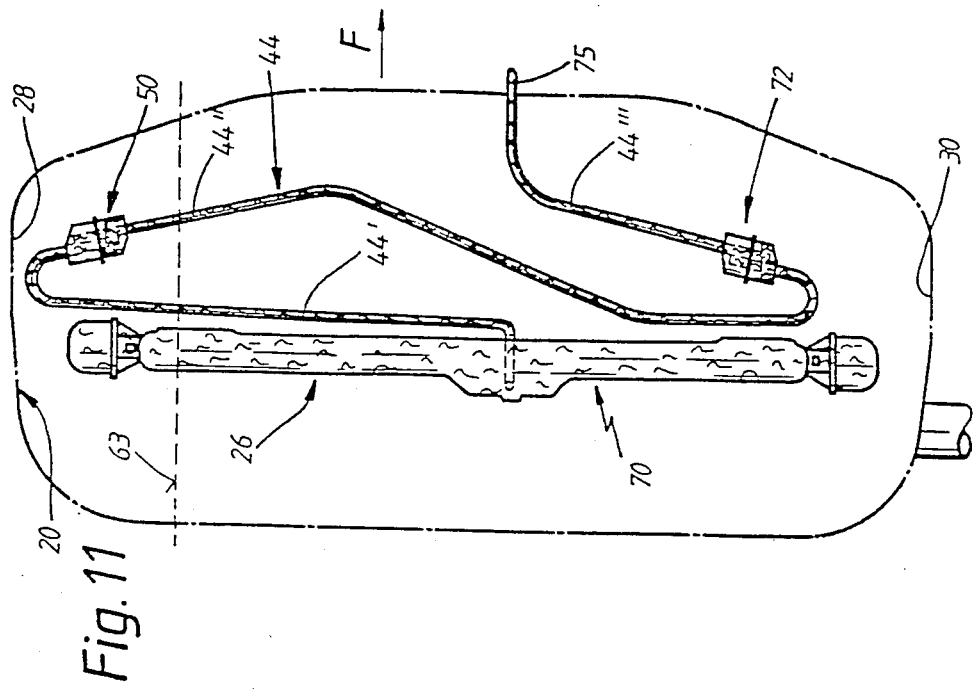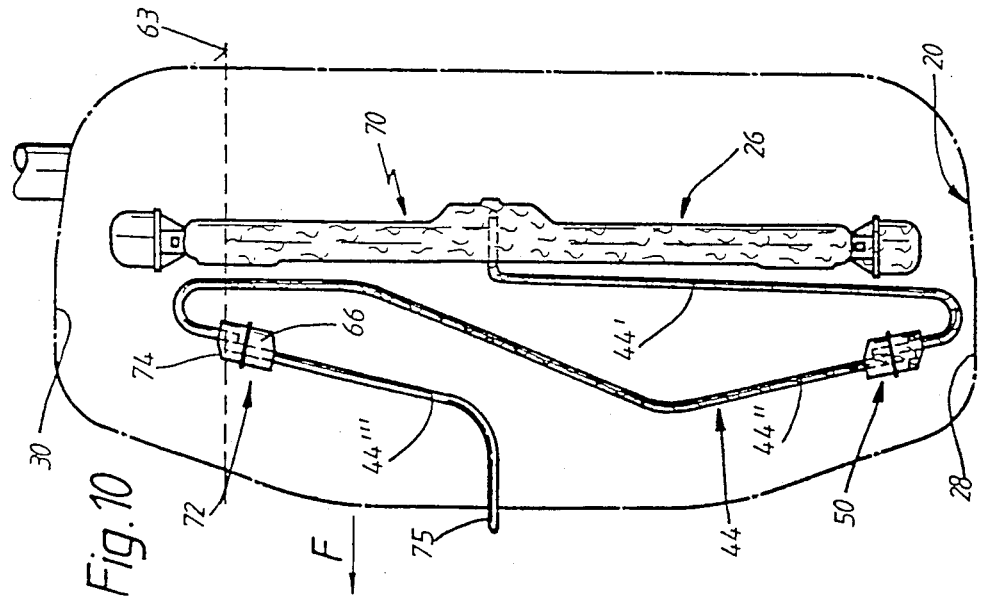

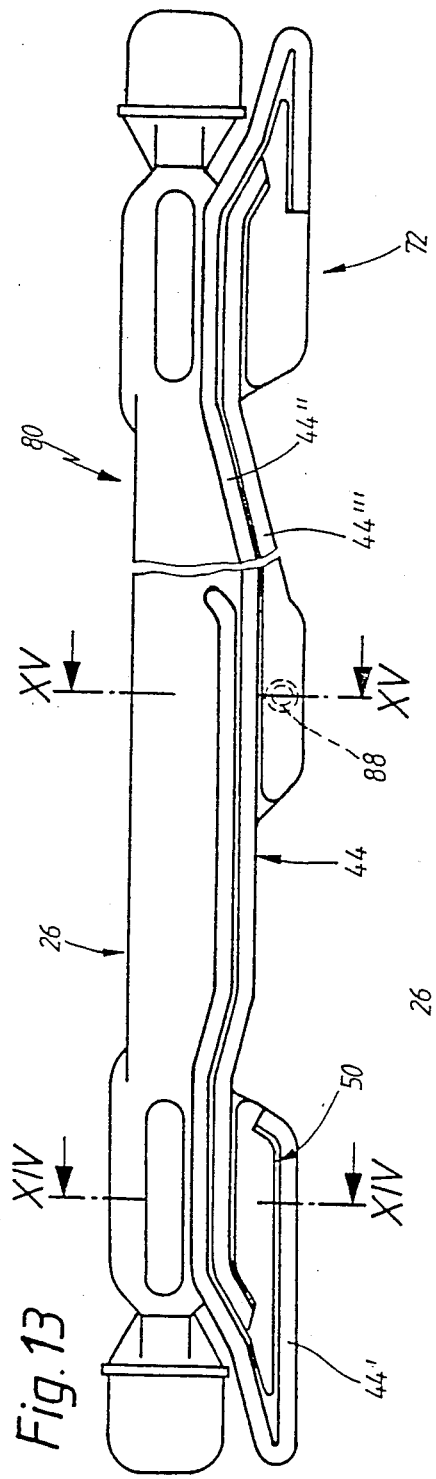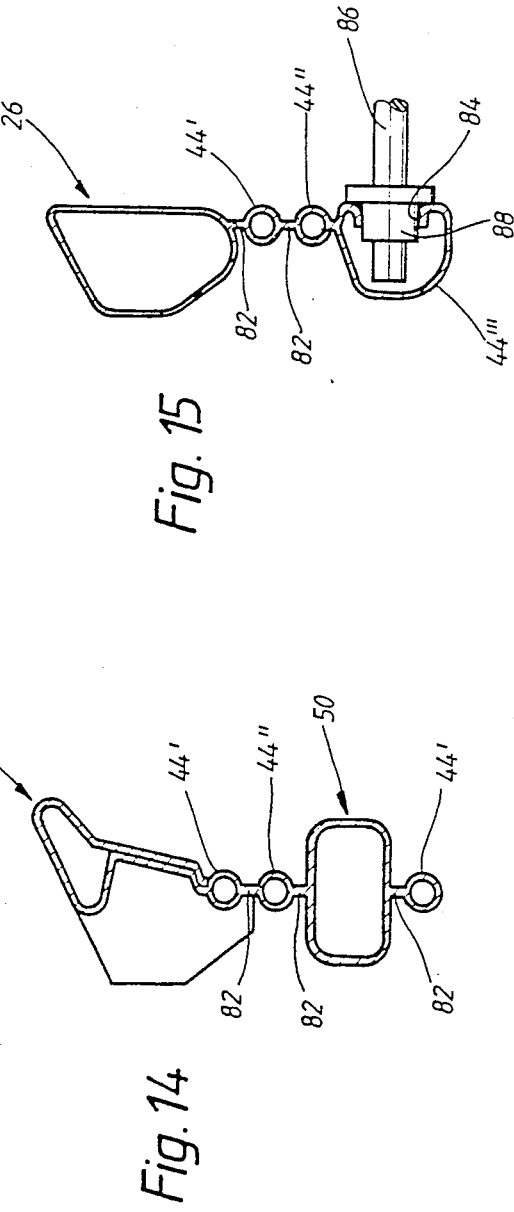
Fig. 13
Fig. 14
Fig. 15

VENTING ARRANGEMENT FOR FUEL TANKS OF MOTOR VEHICLES

BACKGROUND AND SUMMARY OF THE INVENTION

The present invention relates to a venting arrangement for fuel tanks of motor vehicles with an expansion tank arranged above the maximum fuel level, connected with the interior of the fuel tank and extending in the vehicle transverse direction which is vented to the atmosphere by way of a vent or expansion line.

For fire protection reasons, the venting arrangement of fuel tanks is to be constructively so designed that certain safety conditions are fulfilled. One of the regulations in that connection provides that only a certain fuel quantity should flow out of the vent or expansion line of the vent arrangement during a limited time interval both during driving operation as also during a vehicle roll-over with several lateral rotations in any direction of rotation. Thereafter, no fuel must flow out anymore.

These safety conditions are fulfilled by a known vent arrangement which is installed in the interior of the tank but which has not been publicly described.

However, it has been found that in very special positions of fuel tanks equipped with such a vent arrangement, which are not encompassed by the safety regulations, it cannot be completely precluded that fuel can flow nonetheless into the atmosphere in a no longer tolerable quantity by way of the expansion or vent line.

It is therefore the object of the present invention to so improve a vent arrangement of the aforementioned type that also in very special positions deviating from the installed tank position, a fuel escape out of the expansion line beyond the permissive extent can no longer take place with certainty. Additionally, the construction of the vent arrangement is to permit the arrangement thereof inside or outside at the fuel tank or an arrangement separate therefrom.

The underlying problems are solved according to the present invention in that the expansion tank is vented into the atmosphere by way of an expansion or vent line which extends with a first line section starting from the expansion tank horizontally in the vehicle transverse direction up to near the plane of a tank side wall extending in the vehicle longitudinal direction and which extends with a second line section provided with a discharge orifice terminating the atmosphere in the direction toward a plane containing the oppositely disposed side wall and prevents in the inverted position of the fuel tank an outflow of fuel, in that the second line section includes at least one enlargement in proximity of the plane containing one of the tank side walls from which it extends away, in that fuel which flows out of the vent or expansion line sucks gas out of the enlargement when the tank is in a lateral position holding the enlargement above the fuel level, and in that the gas quantity present in the enlargement is sufficient up to the interruption of a siphoning action on the fuel produced inside of the enlargement.

With such a construction of the vent arrangement, in a tank side position in which the section of the expansion line having the enlargement assumes a position underneath the plane of the fuel level, fuel which has reached the expansion tank will flow into this section of the expansion or vent line and therewith also into the enlargement thereof forming a retaining chamber for a gas-air mixture.

The fuel rises thereby in the partial portion of this line section extending from the enlargement upwardly and finally terminating in the atmosphere, according to the principle of communicating pipes, to the level which the fuel has inside of the expansion tank, respectively, in the fuel tank whereas a gas volume remains enclosed in the enlargement. Owing to the fact that the partial line portion extending away from the enlargement into the atmosphere extends section-wise above the plane of the fuel level, the same remains free of fuel. Thus, in this lateral tank position no fuel will flow to the outside from the expansion line.

If the fuel tank is brought subsequently into the inverted (head) position and thereafter into the other side position, then the vent arrangement according to the present invention effects the following:

If the movement of the fuel tank into the inverted position of the tank takes place relatively slowly, then the expansion tank and the expansion or vent line are filled with fuel whereby in the enlargement thereof a certain gas volume remains again enclosed. An outflow of fuel out of the expansion line is prevented in this case, for example, in that the expansion line is so extended in relation to the fuel tank that the line end thereof terminating in the atmosphere is then again in a plane above the fuel level.

If the fuel tank subsequently reaches the other side position, then the section of the expansion or vent line having the enlargement will be located finally above the plane of the fuel level whereas the line end terminating in the atmosphere is disposed in a plane below the fuel level. In this case, only a part of the fuel present in the line section having the enlargement and more particularly only the permissive fuel quantity will then flow out of the same into the atmosphere. This is assured in that the fuel outflow comes to a standstill at a point in time while gas is continuously sucked off in this line section out of the enlargement and fuel is sucked into the enlargement by way of the line section of the expansion or vent line connected with the expansion tank (siphoning action), at which the vacuum produced by the outflowing fuel and thereby continuously becoming weaker is equal to or smaller than the vacuum which is necessary for the further suction of fuel into the enlargement. The volume of the enlargement is so selected for that purpose that the gas volume enclosed in the enlargement in the course of the first lateral tank rotation can continue to flow into the partial portion of the one line section terminating in the atmosphere at least until the pressure conditions in the two line sections of the expansion line terminating in the enlargement and leading away from the same are such that no fuel flows out any longer, respectively, the siphoning action is interrupted.

The vent arrangement equipped with an expansion or vent line having only one enlargement operates thereby reliably insofar as the line section having the enlargement terminates in the atmosphere within the area of the plane of the tank side wall which is disposed opposite the plane of the tank side wall, with respect to which the enlargement is adjacent.

According to a modified construction in accordance with the present invention, a line portion of the expansion or vent line which is connected ahead of the line section terminating in the atmosphere, passes over into the other line section within the area of the plane which is disposed opposite the plane containing the first tank side wall and contains the second tank side wall, and in that a further enlargement is provided in the line section near the plane containing the second tank side wall. This venting arrangement offers the advantage that the position of the end of the expansion or vent line which is open toward the atmosphere, can be provided at any desired distance with respect to the planes containing the tank side walls.

Reference in this application to the tank side walls extending in the vehicle longitudinal direction is not to be interpreted literally but is to be construed as applicable also to side walls insofar as they do not have an exact parallel position with respect to the vehicle longitudinal direction.

The expansion tank of the venting arrangement can be installed inside or outside of the fuel tank. In the former case, the expansion tank is to be arranged near the upper tank wall and the expansion or vent line is to be extended out of the fuel tank.

The expansion tank may thereby be constructed in different ways and may be provided, for example, according to a construction as described in the DE-PS No. 30 30 288.

In the second case, the expansion tank together with expansion or vent line may be arranged on the upper tank wall or at least section-wise at a distance above the same. With the latter constructional variation, the expansion tank may also be arranged on the tank top side, however, bridging a recess formed into the tank top side. Such a recess may form together with the expansion tank a window-like recess when the fuel tank is arranged, for example, behind the backrest of a rear seat bench and covers the same essentially on the back side, through which with a folded-down backrest, relatively long objects such as, for example, skis, can be extended for accommodation in the vehicle.

The expansion tank, however, may also be arranged as such at a distance above the upper tank wall. Such an arrangement is recommended insofar as passenger motor vehicles are to offer a through-loading possibility from the rear side, whose area is to correspond essentially to the overall width of the luggage space.

The present invention offers a considerable advantage insofar as it makes it possible to manufacture the expansion tank, the expansion or vent lines as well as the at least one enlargement as a molded part from plastic material in a cost-favorable manner. Insofar as the expansion tank is to be provided thereby at the upper tank wall on the outside thereof, the possibility exists to make these parts in one piece of plastic material whereby the construction may correspond, for example, to that of the DE-PS No. 24 40 397.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIGS. 3 to 8 illustrate the details of the vent arrangement indicated in dash and dotted lines in FIG. 2 in the following positions of the fuel tank:

FIG. 3 in a side position, rotated toward the left through 90°;

FIG. 4 in the head (inverted) position of the fuel tank (rotated through 180°);

FIG. 5 in the side position rotated toward the left through 270° whereby the instantaneous state of the fuel is indicated at the instant when reaching this side position;

FIG. 6 the side position according to FIG. 5, whereby the state of the fuel is shown at the instant of the interruption of the siphoning action in the enlargement:

FIG. 7 in a side position, rotated toward the right through 90°;

FIG. 8 in a side position, rotated toward the right through 270°;

FIG. 9 is a cross-sectional view of the enlargement provided in the expansion line taken along line IX—IX of FIG. 4:

FIG. 10 is a view of a second embodiment of a vent arrangement installed in a fuel tank and shown shortened, in a side position rotated toward the left through 90°;

FIG. 11 is a view of the vent arrangement according to FIG. 10 in a side position rotated toward the left through 270°, whereby the instantaneous state of the fuel is shown at the instant when reaching this side position inside of the vent arrangement;

FIG. 13 is a plan view on a vent arrangement, similar to FIG. 10, in which the expansion tank, expansion line and enlargements are formed by a one-piece molded body made of plastic material;

FIG. 14 is a cross-sectional view of the vent arrangement according to FIG. 13, taken along line XIV—XIV of this figure;

FIG. 15 is a cross-sectional view of the vent arrangement according to FIG. 13, taken along line XV—XV of this figure;

DETAILED DESCRIPTION OF THE DRAWINGS

Figure 1:
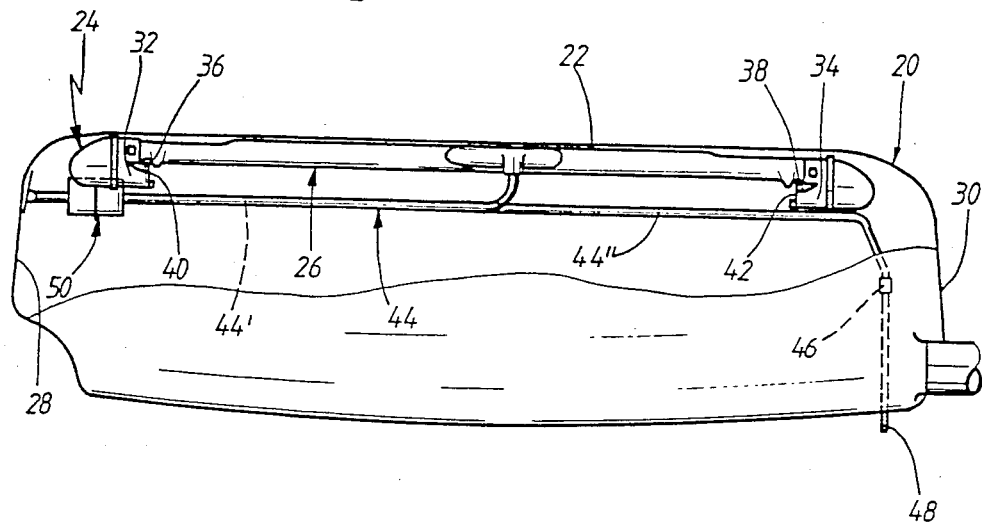
FIG. 1 is a longitudinal cross-sectional view through a first embodiment of a fuel tank with a vent arrangement according to the present invention that is arranged on the inside of the tank.

Referring now to the drawing wherein like reference numerals are used throughout the various views to designate like parts, FIG. 1 illustrates a fuel tank generally designated by reference numeral 20 of a motor vehicle which extends in its installed position transversely to the vehicle longitudinal axis.

A vent arrangement generally designated by reference numeral 24 is installed inside of the fuel tank 20 near its upper tank wall 22. The vent arrangement 24 includes an elongated pipe-like expansion tank 26 secured at the upper tank wall 22, which extends in the vehicle transverse direction up to near the tank side walls 28 and 30 arranged in the vehicle longitudinal direction. A downwardly formed-out chamber 32, respectively, 34 is provided at the expansion tank ends which include at their mutually facing chamber walls an opening each adapted to be closed by means of a flap 40, respectively, 42 pivotal about an upper horizontal pivot axis 36, respectively, 38.

The expansion tank 26 is vented toward the atmosphere by way of a vent or expansion line generally designated by reference numeral 44 which is preferably connected in the longitudinal center of the expansion tank 26. The expansion line 44 exits out of the fuel tank 20 at 46 and, as shown in FIG. 1, is extended along the outside thereof so far in the downward direction that the free line end 48 thereof is located above the maximum possible fuel level when the fuel tank 20 is in the head (inverted) position (rotation through 180°). An outflow of fuel in such a tank position is not possible thereby. An explanation of the operation of the vent arrangement described so far is dispensed with herein as vent arrangements operating with flaps or valves are known as such (see DE-PS No. 29 12 214; DE-PS No. 34 13 399). The expansion tank 26 could also be constructed in the manner of the expansion tanks of these known vent arrangements.

Figure 2:
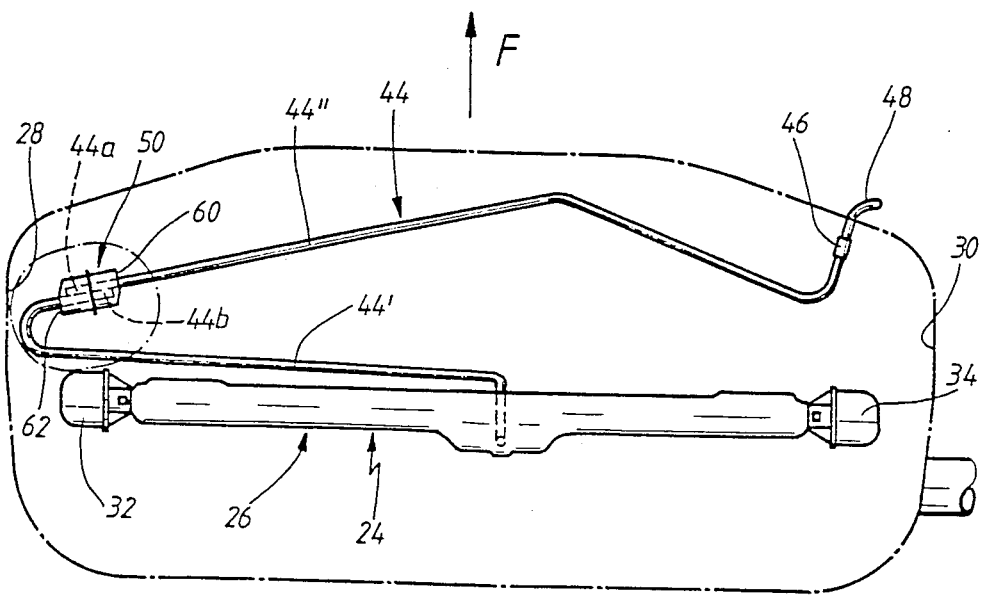
FIG. 2 is a plan view on the vent arrangement shown in FIG. 1, on an enlarged scale.

FIG. 2 illustrates the lay-out of the vent or expansion line 44 inside of the fuel tank 20. This line 44 extends, starting from the expansion tank 26 in a plane below the latter in the vehicle transverse direction essentially horizontally up to near the one tank side wall 28 at which it is fixed in any suitable manner. This line section designated by reference numeral 44' is bent thereat approximately in the shape of a semi-circle so that the adjoining line section 44' which terminates in the atmosphere extends in the direction toward the other tank side wall 30 and leaves the interior of the tank at 46. The coordination of the expansion line 44 to the expansion tank 26 in height can be chosen at will.

The line section 44" includes near the tank side wall 28 which is disposed opposite the tank side wall 30, and more particularly adjoining the curved portion of the line section 44', an enlargement 50, for example, in the form of a cylindrical elongated vessel of circular cross section which forms a retaining chamber for a gas mixture consisting of evaporated fuel and air. The arrangement of the enlargement 50 is thus made in such a manner that it is disposed below the then existing fuel level 63 in the one tank side position and the line end 48 above the then existing fuel level 63 whereas in the other tank side position the enlargement 50 is above the fuel level 63 and the line end 48 below the same.

The enlargement 50 may also have any other desired construction; it is only important that its size is sufficient in order to hold back a predetermined gas quantity in the tank head (turned over) position as will be explained more fully hereinafter.

In the illustrated embodiment, the enlargement 50 is formed, for example, by two cup-like partial pieces 52 and 54 which are welded together. As shown in FIG. 2, the one end piece 44a of the line section 44" of the expansion line 44 passes through one end wall 60 of the enlargement 50 and extends within the same up to near the other end wall 62. Similarly, the one end piece 44b of the line section 44' passes through the end wall 62, extends past the opening of the line end piece 44a and reaches preferably up to near the end wall 60 of the enlargement 50.

The two line end pieces 44a and 44b thus protrude into the enlargement 50 in mutually opposite directions whereby they are in a common horizontal plane, in relation to the installed position of the fuel tank. The two line end pieces 44a and 44b could also be connected within the area of the end wall 60, respectively, 62 adjacent their discharge opening at the circumference of the enlargement 50 in such a manner that in the head position of the fuel tank 20, in which fuel can enter the expansion tank 26, the expansion line 44 and the enlargement 50, as already indicated above, a certain gas volume remains enclosed in the enlargement 50.

The described vent arrangement 24 operates as follows with atmospheric pressure inside the tank:

It is assumed that the fuel tank 20 is tilted from its installed position illustrated in FIG. 1, for example, opposite the driving direction indicated in FIG. 2 by an arrow F obliquely downwardly in such a manner that the vented expansion tank 26 and possibly the expansion line 44 come to lie below the fuel level and fuel can enter the same as a result thereof.

With a following lateral rotation of the fuel tank 20 through 90° toward the left, the line section 44" of the expansion line 44 which includes the enlargement 50 immerses into the fuel whereby the fuel level will adjust itself, for example, at 63.

In this tank side position, the line section 44' fills itself completely with fuel and the line section 44" up to the height of the fuel level 63. The fuel 64 which has reached the enlargement 50 owing to the prior inclined positioning of the fuel tank 10, remains within the same as also the supply of a gas mixture 66 which was present therein.

As the expansion line 44 together exits out of the fuel tank with its line section 44" above the fuel level 63, no fuel can flow to the outside in this tank side position out of the line section 44". In lieu of such a layout of the expansion line 44 outside of the fuel tank 20, the same may also be equipped with a valve arrangement at its exit place 46 on the fuel tank 20, by means of which possibly a closure pressure is produced that may correspond to a certain interior tank pressure which builds up when the fuel heats up.

If the head position of the fuel tank 20 according to FIG. 4 follows the described tank side position, the gas volume 66 present in the enlargement 50 remains caught in the enlargement 50, as shown in FIG. 9, whereas the expansion tank 26 as well as the expansion line 44 are filled completely and the enlargement 50 according to FIG. 9 partially with fuel. However, as in this case, the line end 48 of the expansion line 44 is located above the fuel level 63, no fuel can escape to the outside out of the expansion line 44 in this tank position.

If a further tank lateral rotation through 270° in the same left direction of rotation follows the tank head position, then the section 44" of the expansion line 44 which includes the enlargement 40 again emerges out of the fuel whereby, however, the line end 48 of the expansion line 44 comes to lie below the plane of the fuel level 63. FIG. 5 thereby illustrates the filling degree of the expansion line 44 at the instant when the enlargement 50 emerges out of the fuel. At this instant in time, its two line sections 44' and 44" are still filled with fuel and the line end piece 44b of the line section 44' is located inside of the fuel quantity 64 present in the enlargement 50 whereas the line end piece 44a of the line section 44" is located inside of the volume of gas mixture 66 present in the enlargement 50.

As in this tank side position the line end 48 of the expansion line 44 is located in a plane below the fuel level 63, a portion of the fuel quantity present inside of the line section 44" will now flow out of the expansion line 44, to the outside whereby the fuel column 64' which therefore drops downwardly in the line section 44" under the influence of gravity, produces in the enlargement 50 a vacuum and constantly sucks gas out of the same from the present gas volume 66.

As can be seen from FIG. 6, fuel 64 will flow out downwardly to the outside out of the line section 44" downwardly for such length of time until the volume of the fuel column 64' in the line section 44" has decreased to such an extent that the height h thereof corresponds to th height $\bar{h}$ of a fuel column which is located in the line section 44' and corresponds essentially to the distance of the wall inner surface of the end wall 62 of the enlargement 50 from the fuel level 63.

As long as the fuel column 64' is higher than a section of the fuel column contained in the line section 44' and corresponding to the height $\bar{h}$, a vacuum is effective in the line section 44", by means of which a siphoning action is exerted in the enlargement 50 on the fuel volume present in the line section 44', as a result of which fuel 64 will continue to flow constantly into the enlargement 50 out of the line section 44'.

The volume of the gas mixture 66 to be stored in the enlargement 50 is thereby selected so large that it suffices to keep in the enlargement 50 the level 68 of the fuel 64 continuing to flow into the enlargement for the interruption of the siphoning action below the upwardly disposed opening of the line end piece 44a (FIG. 5).

FIG. 7 illustrates the position of the enlargement 50 in a tank side position rotated through 90° toward the right, above the fuel level 63, whereas FIG. 8 illustrates the position thereof in the other tank side position after a rotation through 270° in the same direction of rotation.

In the former case, no fuel reaches the enlargement 50 whereas in the latter case no fuel can flow out owing to the line end 48 of the line section 44" located above the fuel level 63 and the fuel and the gas mixture will establish themselves in the line section 44' and in the enlargement 50, as shown in FIG. 8.

The embodiment illustrated in FIG. 10 of a venting arrangement 70 is characterized in that a further enlargement 72 is interconnected in the line section 44" of the expansion line 44 leading away from the enlargement 50 in the direction toward the atmosphere. The line section 44" thereby extends initially in the direction of the tank side wall 30 disposed opposite the tank side wall 28 and in proximity thereof extends again in the direction of the tank side wall 28, by being bent whereby the enlargement 72 is preferably provided in the line section 44''' which continues again in the direction toward the tank side wall 28.

The additional arrangement of the further enlargement 72 offers the possibility to be able to provide the exit place 75 of the expansion line 44 at the fuel tank 20 in any desired location, for example, at a place particularly favorable as regards constructive peculiarities and independent of the maximum possible fuel level 63 which may establish itself in this tank side position.

With the arrangement of the enlargement 72 provided in the line section 44''', for example, the line section 44'''' is extended, analogous to the line section 44'' in the enlargement 50, inside the enlargement 72 up to near the end wall 74 whereas the end piece of the line section portion 44'' extending through the end wall 74 protrudes preferably only partly into the enlargement 72.

As shown in FIG. 10, fuel will rise up to the height of the fuel level 63 inside of the expansion tank 26 and the expansion line 44 in a tank side position rotated through $\pi°$ toward the left, as viewed in the driving direction F. A gas volume will be enclosed in the enlargement 50 whereas the enlargement 72 will be vented, respectively, remain free of fuel. As a result thereof, no fuel will reach the outside notwithstanding the exit place 75 of the line section 44''' disposed below the fuel level 63.

In with a continuing rotation through 270° the fuel tank 20 reaches the other side position, then in the meantime, the expansion tank 26 and the expansion line 44 have been filled essentially completely with fuel and the enlargements 50 and 72 with fuel under enclosure of a gas bubble.

FIG. 11 illustrates, analogous to FIG. 5, the instant when the enlargement 50 emerges out of the fuel. As can be seen from FIG. 12, in the course of this emerging, the fuel column can drop downwardly in the line section 44'' because the exit place 75 of the line section 44''' is located below the fuel level 63 and fuel can flow out to the outside.

The fuel column dropping in the line section 44'' thereby effects in the enlargement 50 a siphoning effect already described in connection with FIG. 6, which is interrupted for stopping a tolerable fuel outflow as soon as the height h of the part of the fuel column disposed in the line section 44'' above the line end discharging into the atmosphere corresponds to the distance $\bar{h}$, with which the inner surface of the end wall 62 of the enlargement 50 is disposed above the fuel level 63.

During the outflow of a tolerable fuel quantity out of the fuel tank 20 determined by the gas volume in the enlargement 50, by way of the enlargement 72, the gas volume present in the same remains preserved unchanged.

During lateral rotations toward the right, by contrast, no fuel will reach the enlargements 50 and 72 because the enlargement 50 will be above the fuel level 63 in a 90° tank side position.

After a 270° lateral rotation, by contrast, fuel will again be present in both enlargements 50 and 72 by reason of the preceding tank head position, whereby in the 270° tank side position, the same physical conditions for the interruption of the siphoning action will establish themselves with respect to the siphoning action produced in the enlargement 72 by fuel flowing out of the line section 44''' as explained in conjunction with FIGS. 5 and 6.

Figure 12:
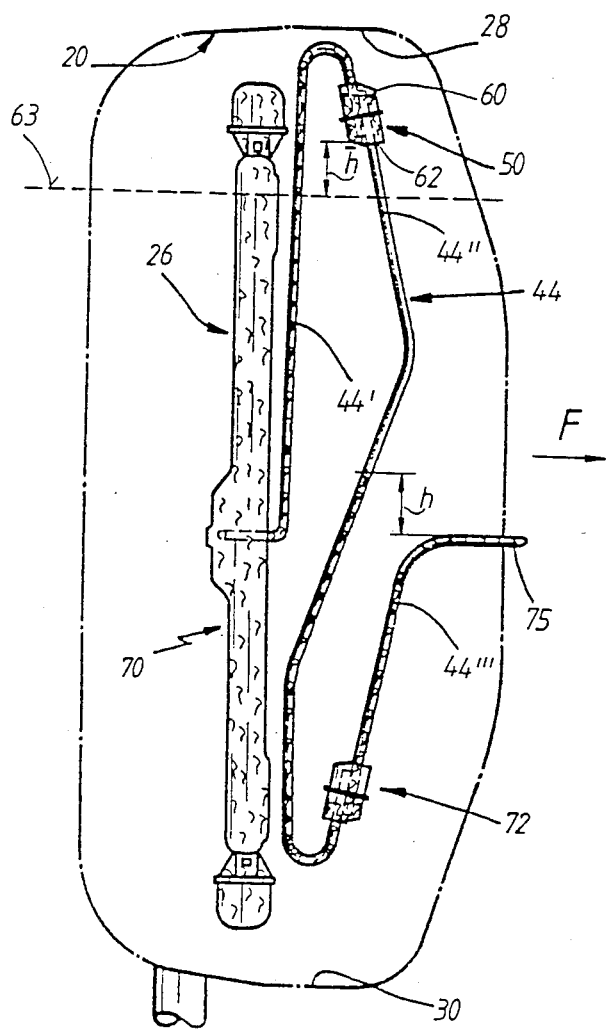
FIG. 12 is a view of the tank side position according to FIG. 11 whereby the state of the fuel is shown at the instant of the interruption of the siphoning action in the upper enlargement in this side position.

FIG. 13 illustrates an embodiment of a vent arrangement 80 which is similar to the type of construction according to FIGS. 10 to 12 so that parts corresponding in their function are designated in both embodiments according to FIGS. 10 to 12 and 13 by the same reference numerals.

In this embodiment, the expansion tank 26, the expansion line 44 and the enlargements 50 and 72 of the venting arrangement designated by reference numeral 80 are formed by a one-piece molded part blown of plastic material in a single operating step.

It can thereby be seen from FIGS. 14 and 15 that for forming the individual components of the vent arrangement which are in one piece with one another, an extruded plastic hose is squeezed off radially to its hose axis during the blowing operation in such a manner that the individual components 26, 44′, 44″, 44‴ and 50, respectively, 72, are connected with each other by connecting webs 82 preferably provided in a common plane.

FIG. 15 thereby illustrates the connection of the expansion tanks 26 with the atmosphere for which purpose a connecting nipple 88 seated on an outlet line 86 is inserted into a wall opening 84 of the line section 44‴ constructed closed at its end side.

Figure 16:
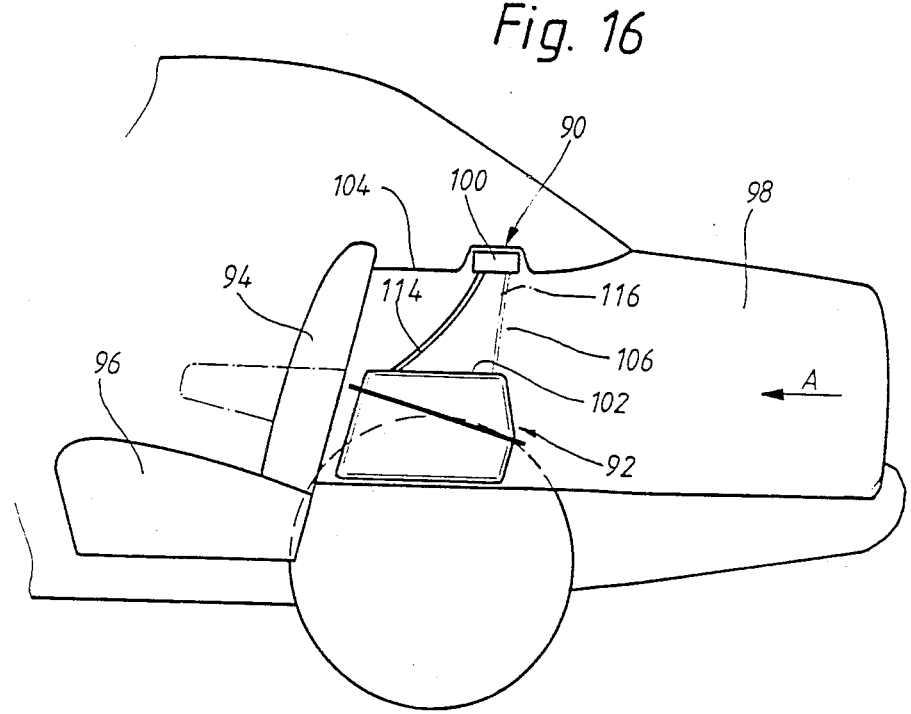
FIG. 16 is a schematic side view of a fuel tank installed in the rear section of a motor vehicle whose vent arrangement is installed according to this invention in a third embodiment at a distance above the fuel tank.
Figure 17:
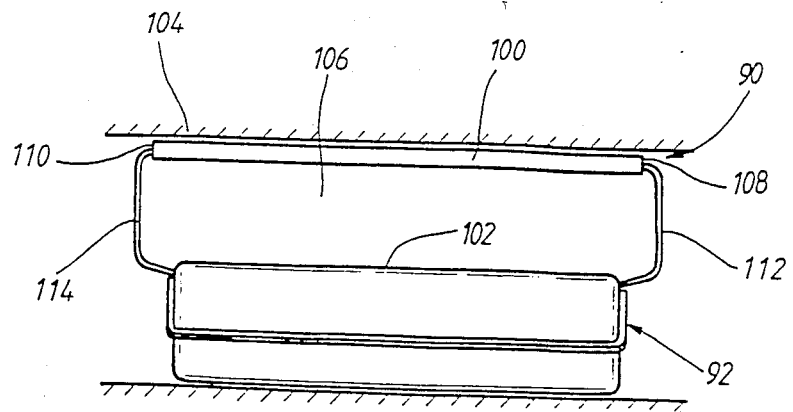
FIG. 17 is a view of the fuel tank together with vent arrangement taken in a direction of the arrow A of FIG. 16.
Figure 18:
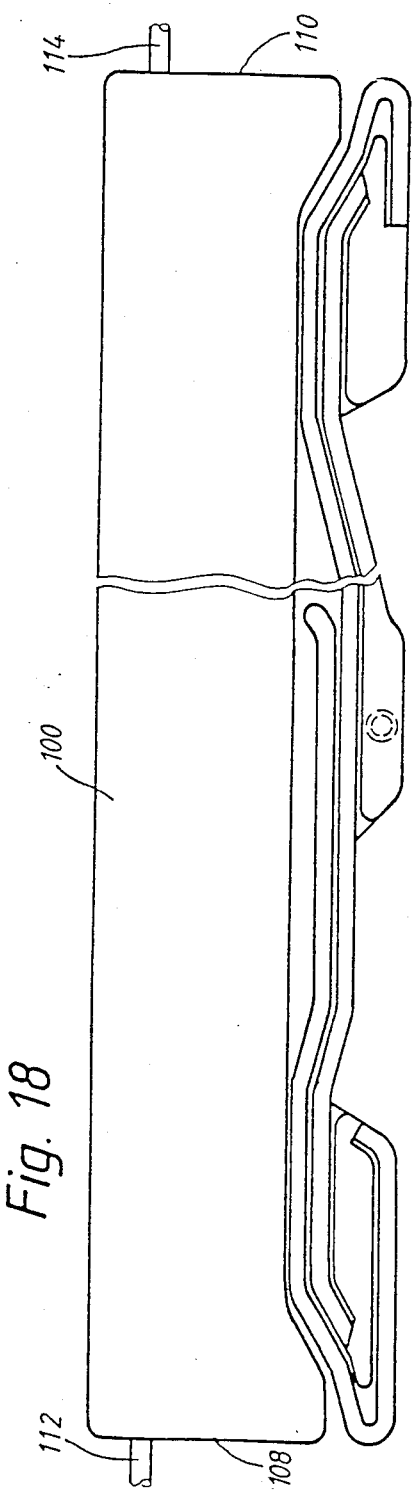
FIG. 18 is a plan view on the expansion tank of the vent arrangement according to FIG. 16, illustrated in shortened representation.

In the third embodiment illustrated in FIGS. 16 to 18 of a vent arrangement generally designated by reference numeral 90, the fuel tank 92 is provided in the rear section of a motor vehicle as a tank of flat construction which has only a part of the height of a backrest 94 of a rear seat cushion 96 arranged in front thereof.

As indicated in dash-and-dotted lines, either the backrest 94, a part thereof, or only a center arm rest of the same can be tilted forwardly so that a luggage space 98 adjoining the backrest 94 can be enlarged if needed in the direction of the passenger cell. The flat construction of the fuel tank 92 which is necessary therefor, does not permit an accommodation of the vent arrangement 90 on the inside of the tank.

As shown in FIGS. 16 and 17, the expansion tank generally designated by reference numeral 100 of this embodiment is therefore arranged outside of the fuel tank 92 at a distance above its upper tank wall 102 and is integrated, for example, into a hat deposit shelf 104 covering the luggage space 98. The fuel tank 92 and the hat deposit shelf 104 thereby extend transversely to the vehicle longitudinal direction. Thus, a free intermediate space 106 exits between the two which creates a through-loading possibility above the fuel tank 92, for example, with a forwardly folded backrest 94.

The expansion tank 100 may, analogous to the embodiment according to FIGS. 13 to 15, be constructed as blown one-piece molded part of plastic material; however, with the difference that in this case, it is to be constructed closed at its end faces 108 and 110 and is to be connected thereat by way of at least one respective connecting line 112, respectively, 114 with the upper section of the tank interior space.

Insofar as the fuel tank 92 should not have any expansion volume and accordingly can be filled completely with fuel, the fuel which will expand within the same can be displaced by way of the connecting lines 112 and 114, for example, by way of hoses to be laid out advantageously, into the expansion tank 100. In case that the construction of the fuel tank 92 is made in such a manner that with maximum tank filling the upper tank interior space remains free for creating an expansion volume of fuel, two connecting lines are to be connected preferably one at each end face, 108 and 110 as is indicated in FIG. 16 by a further dash-and-dotted connecting line 116, which are then to be connected each with the full tank 92 within the area of one of the two longitudinal edges of the upper tank wall 102. A safe tank ventilation and tank venting is assured thereby when parking the vehicle in inclines or declines.

Figure 19:
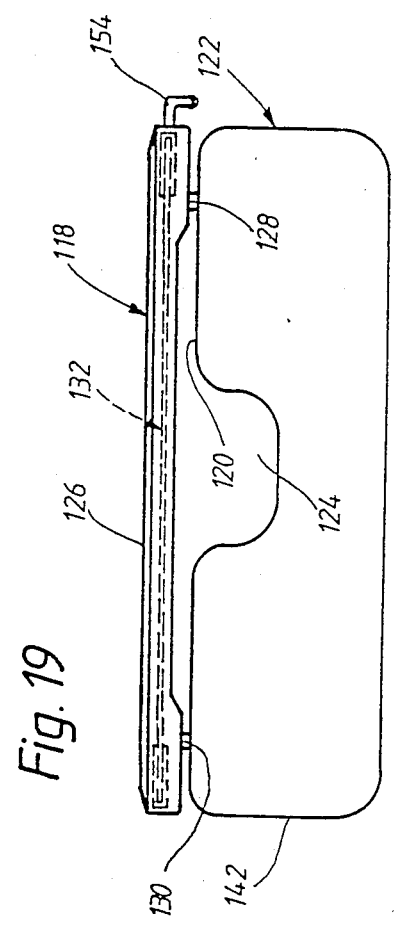
FIG. 19 is a rear view of a fourth embodiment of a fuel tank with a vent arrangement according to the present invention and arranged on the top wall thereof.
Figure 20:
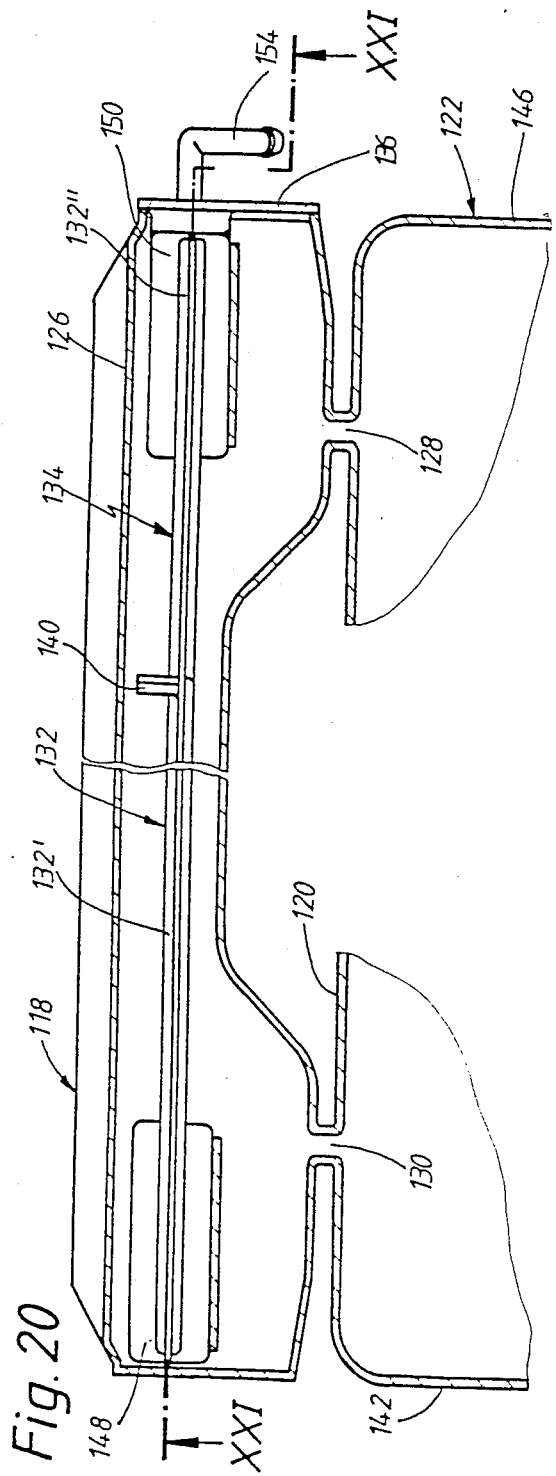
FIG. 20 is a longitudinal cross-sectional view through the expansion tank according to FIG. 19, again illustrated shortened.
Figure 21:
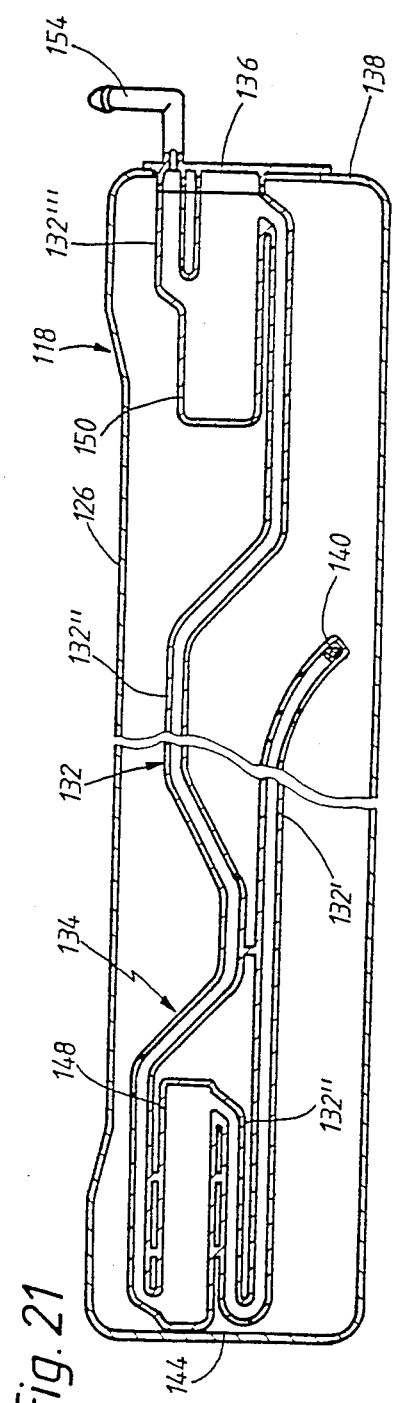
FIG. 21 is a horizontal cross-sectional view through the expansion tank according to FIG. 20, taken along line XXI—XXI of this Figure.

A fourth embodiment of a vent arrangement is shown in FIGS. 19 to 21 and is generally designated therein by reference numeral 118. In this case, the venting arrangement 118 is seated on the upper tank wall 120 of a fuel tank 122 which, analogous to the fuel tank 92, is to be positioned behind a backrest of a rear seat bench (not illustrated in detail) and essentially completely covers the same on the back side.

In order to create also in this case a through-loading possibility, the fuel tank 122 includes at the tank top side, preferably in the longitudinal center thereof, a corresponding recess 124 which is bridged by the expansion tank 126. within the area of its end faces at 128 and 130 the expansion tank interior is constantly connected with the fuel tank interior space, whereby both parts are blown in one piece and as molded body of plastic material.

The vent arrangement 118 differs thereby from the previously described embodiments in that the expansion line 132 connected to the expansion tank 126 is integrated into the same. For that purpose, it forms a one-piece insert 134 preferably made of plastic material, which is inserted into the expansion tank 126 from an open expansion tank end wall 138 adapted to be closed by means of a closure lid 136.

The insert 134 includes a first line section 132′ terminating in the interior of the expansion tank 126 at 140, which extends in the vehicle transverse direction within the area of the plane of the one tank side wall 142, respectively, up to the left tank end face 144 according to FIG. 21. A line section 132″ extending in the direction toward the plane of the other tank side wall 146 adjoins this line section 132′ which in proximity of the tank end wall 144 as also in proximity of the tank end wall 138 passes over into a vessel-like enlargement 148, respectively, 150. A line section 132‴ leads away from the enlargement 150, which continues through the closure lid 136 and terminates in a discharge connection nipple 154 which is formed-on at the same.

The function of the vent arrangement according to the third and fourth embodiments corresponds to the already described function of the vent arrangement according to FIGS. 10 to 12.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fuel tank arrangement for motor vehicles comprising:
   a fuel tank,
   expansion tank means disposed above the maximum fuel level in the fuel tank during normal vehicle upright driving conditions and operatively connected with the interior of the fuel tank;
   expansion line means for venting the expansion tank means to the atmosphere, said expansion line means including first and second line sections, said first line section extending substantially horizontally from the expansion tank means to a position adjacent the plane of a first fuel tank side wall, said second line section adjoining the first line section and having a discharge to the atmosphere, said expansion line means being operable in an inverted position of the fuel tank to prevent flow-out of fuel; and an enlargement means in said expansion line means, said enlargement means including entrapment means for entrapping a predetermined gaseous volume during overturning of the fuel tank and siphoning means with fuel flow interruption means operable such that outflow of fuel through the discharge of the second line section to atmosphere effects a suction of a portion of the gaseous volume into the second line section downstream of the enlargement means and an automatic interruption of the fuel siphoning action and stoppage of fuel flow out the discharge.

2. An arrangement according to claim 1, wherein a line part of the second line section which is series-connected ahead of the discharge to the atmosphere passes over into the first line section within the area of a plane which is disposed opposite the plane of the first tank side wall and which contains the second tank side wall, and wherein a further enlargement means is provided in the series-connected line part near the plane containing the second tank side wall.

3. An arrangement according to claim 2, wherein the expansion tank means is arranged on the inside of the fuel tank near its top tank wall, and wherein the expansion line means exits out of the fuel tank.

4. An arrangement according to claim 2, wherein each of said enlargement means include respective closed chambers with portions of said expansion line means extending into the respective chambers in opposite directions and opening into the chambers at a spacing from respective opposite end walls of the chambers.

5. An arrangement according to claim 1, wherein the expansion tank means is arranged on the inside of the fuel tank near its top tank wall, and wherein an expansion line means exits out of the fuel tank.

6. An arrangement according to claim 1, wherein the expansion tank means together with the expansion line means are provided outside of the fuel tank.

7. An arrangement according to claim 6, wherein the expansion tank means together with the expansion line means are seated on the upper tank wall of the fuel tank.

8. An arrangement according to claim 6, wherein a spacing is present between the expansion tank means and an upper tank wall at least within certain areas.

9. An arrangement according to claim 8, wherein the expansion tank means bridges a recess formed into the top side of the fuel tank.

10. An arrangement according to claim 1, wherein the expansion tank means, the expansion line means and the enlargement means are made in one piece of plastic material.

11. An arrangement according to claim 1, wherein the fuel tank and the expansion tank means provided on the outside at the upper tank wall thereof and at least some of the expansion line means are made in one piece of plastic material.

12. An arrangement according to claim 11, wherein the expansion line means including the two line sections and enlargement means forms an insert means insertable into the expansion tank means, whereby the second line section terminating in the atmosphere extends through an end wall of the expansion tank means.

13. An arrangement according to claim 12, wherein the part of the expansion line means forming the insert means is equipped with two enlargement means, of which one is closed off by an end wall of the expansion tank means and wherein said end wall is traversed by a connecting channel terminating in the enlargement means, a partial portion of the expansion line means which terminates in the atmosphere being operatively connected with the connecting channel.

14. An arrangement according to claim 1, wherein said first line section extends substantially in the vehicle transverse direction, and wherein the plane of the first fuel tank sidewall extends substantially in the vehicle longitudinal traveling direction.

15. An arrangement according to claim 14, wherein said second line section extends from said first line section back toward a plane of a second fuel tank sidewall disposed opposite to and substantially parallel to the first fuel tank sidewall.

16. An arrangement according to claim 15, wherein said expansion line means and enlargement means include means for filling the part of the second line means downstream of the enlargement means with fuel during rolling over of the vehicle through 270° around its longitudinal axis, at which point the discharge is located below the level of fuel in the expansion tank means, and wherein, in the rollover condition, only a portion of the fuel in said part of the second line means flows out through the discharge with consequent suction of the gaseous volume from the enlargement means and automatic interruption of further outflow of fuel.

17. An arrangement according to claim 1, wherein said expansion line means and enlargement means include means for filling the part of the second line means downstream of the enlargement means with fuel during rolling over of the vehicle through 270° around its longitudinal axis, at which point the discharge is located below the level of fuel in the expansion tank means, and wherein, in the rollover condition, only a portion of the fuel in said part of the second line means flows out through the discharge with consequent suction of the gaseous volume from the enlargement means and automatic interruption of further outflow of fuel.

18. An arrangement according to claim 13, wherein said enlargement means includes a closed chamber with said first line section extending through one chamber end and opening at a small spacing from an opposite chamber end and with said second line section extending through said opposite chamber end and opening at a small spacing from said one end.

19. An arrangement according to claim 1, wherein said first line section is connected to the center of the expansion tank means.

* * * * *